Figure 1:
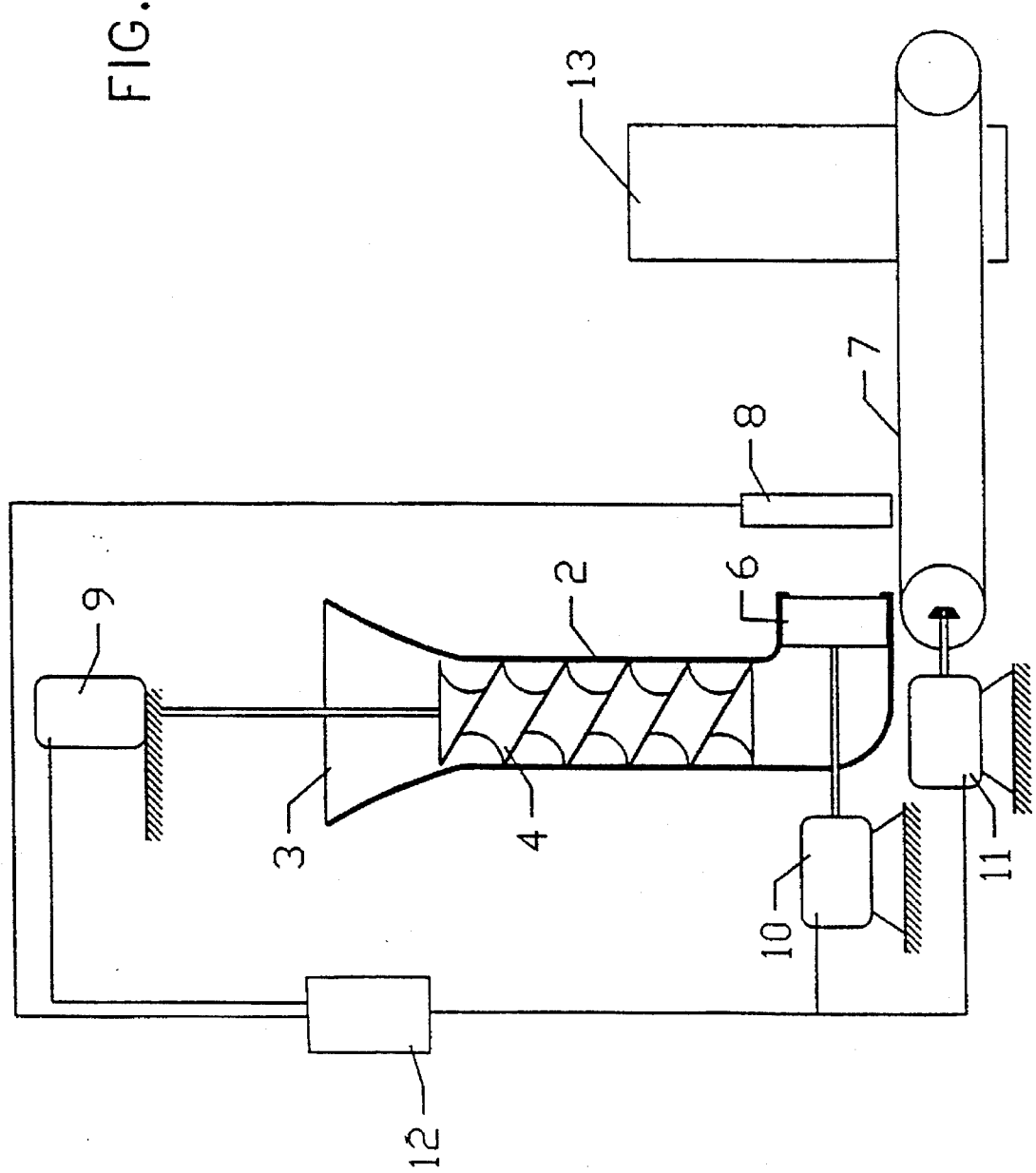

United States Patent [19]
Rivlin

[11] Patent Number: 5,637,341
[45] Date of Patent: Jun. 10, 1997

[54] METHOD AND APPARATUS FOR PRODUCING BRAIDED BAKED PRODUCTS

[76] Inventor: Ram Rivlin, 14 Hatirosh Street, 73127 Hasmona'im, Israel

[21] Appl. No.: 637,787

[22] PCT Filed: Oct. 24, 1994

[86] PCT No.: PCT/US94/12189

§ 371 Date: Jul. 9, 1996

§ 102(e) Date: Jul. 9, 1996

[87] PCT Pub. No.: WO95/12319

PCT Pub. Date: May 11, 1995

[51] Int. Cl.⁶ .............................. A21C 3/00; A21D 8/00; A23P 1/00
[52] U.S. Cl. ............... 426/496; 99/353; 425/382.3; 425/382 R; 426/500; 426/503; 426/516
[58] Field of Search ....................... 426/496, 500, 426/501, 503, 516, 517, 518; 99/353; 425/131.1, 382.3, 382 R

[56] References Cited

U.S. PATENT DOCUMENTS 2,856,868  10/1958  Kennedy ........................ 426/500
3,876,743   4/1975  Soderlund et al. ............ 426/500

*Primary Examiner*—George Yeung
*Attorney, Agent, or Firm*—Ladas & Parry

[57] ABSTRACT

A method and apparatus for producing a braided baked product from dough by feeding the dough through a die head having at least three relatively-moving die members each formed with an orifice feeding a strip of the dough, moving the die members relative to each other during the feeding of the dough to cause the strips to interweave, and baking the interwoven strips to produce the braided baked product.

12 Claims, 5 Drawing Sheets

FIG. 3
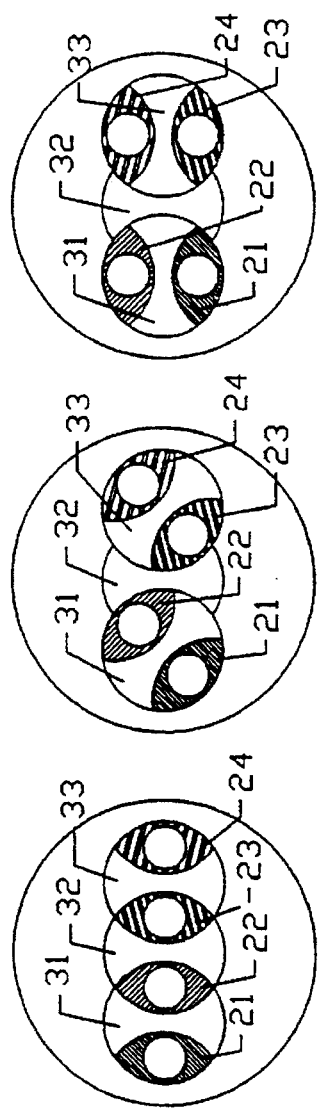
Fig. 3a  Fig. 3b  Fig. 3c
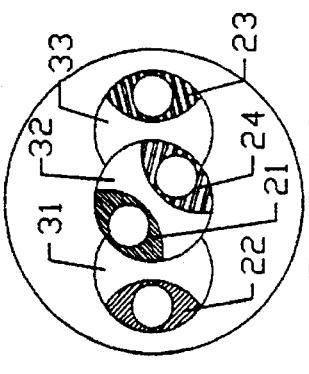
Fig. 3d
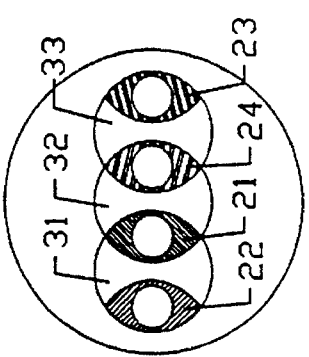
Fig. 3e
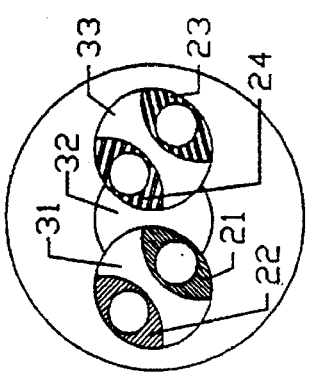
Fig. 3f
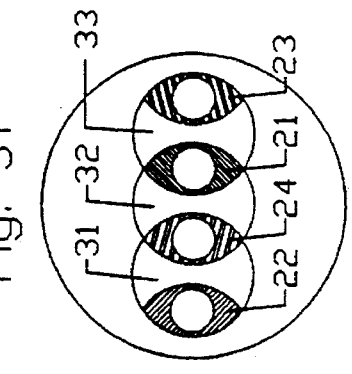
Fig. 3g
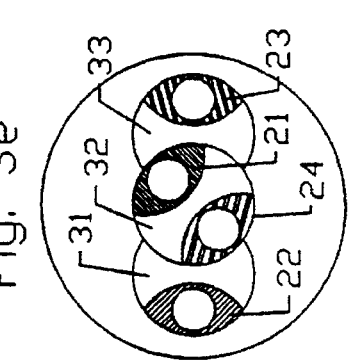
Fig. 3h
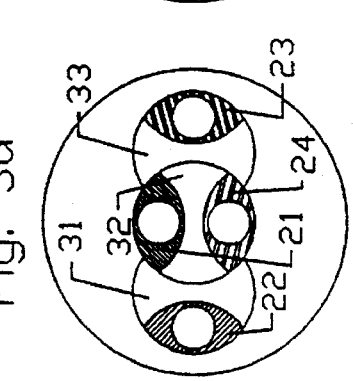
Fig. 3i

METHOD AND APPARATUS FOR PRODUCING BRAIDED BAKED PRODUCTS

The present invention relates to a method and apparatus for producing braided baked products. The invention is particularly useful for making challahs or rolls, and is therefore described below with respect to this application.

Challah is a loaf of yeast-leavened bread, usually braided, and tradionally eaten by Jews on the Sabbath, holidays and ceremonial occasions. At the present time, braiding the dough is generally done manually, either by shaping a strip of the dough into the digit "8", or by interweaving a plurality of strips, usually four, of the dough into a braid. Manually forming the braids when making challahs, rolls or other braided baked products, is not only a relatively slow, tedious and costly process, but is also a non-hygienic process because of the human contact with the dough. While attempts have been made to mechanize the production of challah and other braided baked products, insofar as I am aware none of the proposed mechanisation techniques has been found to be satisfactory, and therefore to this day challahs and other braided baked products are generally still produced manually.

An object of the present invention is to provide a method and also an apparatus for producing braided baked products, such as challahs and rolls.

According to one aspect of the present invention, there is provided a method of producing a braided baked product from dough, comprising: feeding the dough through a die head having at least three relatively-movable die members each formed with an orifice feeding a strip of the dough; moving the die members relative to each other during the feeding of the dough to cause the strips to interweave; and baking the interwoven strips to produce the braided baked product.

According to further features in the described preferred embodiment, the die members are plates of the same external shape and are movable relative to each other by at least two rotatable drive members. Each die member is formed on its outer circumference with at least two cavities of a shape complementary to that of the die plates for receiving and moving the die plates during the rotation of the drive member. The drive members are in the form of equal-diameter discs having parallel axes of rotation spaced from each other a distance such that each die plate is receivable in either cavity of each drive disc so as to be moved by the rotation of the drive disc.

The invention also provides apparatus for producing braided baked products in accordance with the above method.

As will be described more particularly below, the method and apparatus of the present invention enable braided baked products, such as challahs or rolls, to be produced in a mechanized continuous manner eliminating, or minimizing, human contact with the dough such that the production of the braided baked product enables a substantially savings to be made in labor and also provides better hygienic conditions.

Further features and advantages of the invention will be apparent from the description below.

Figure 2:
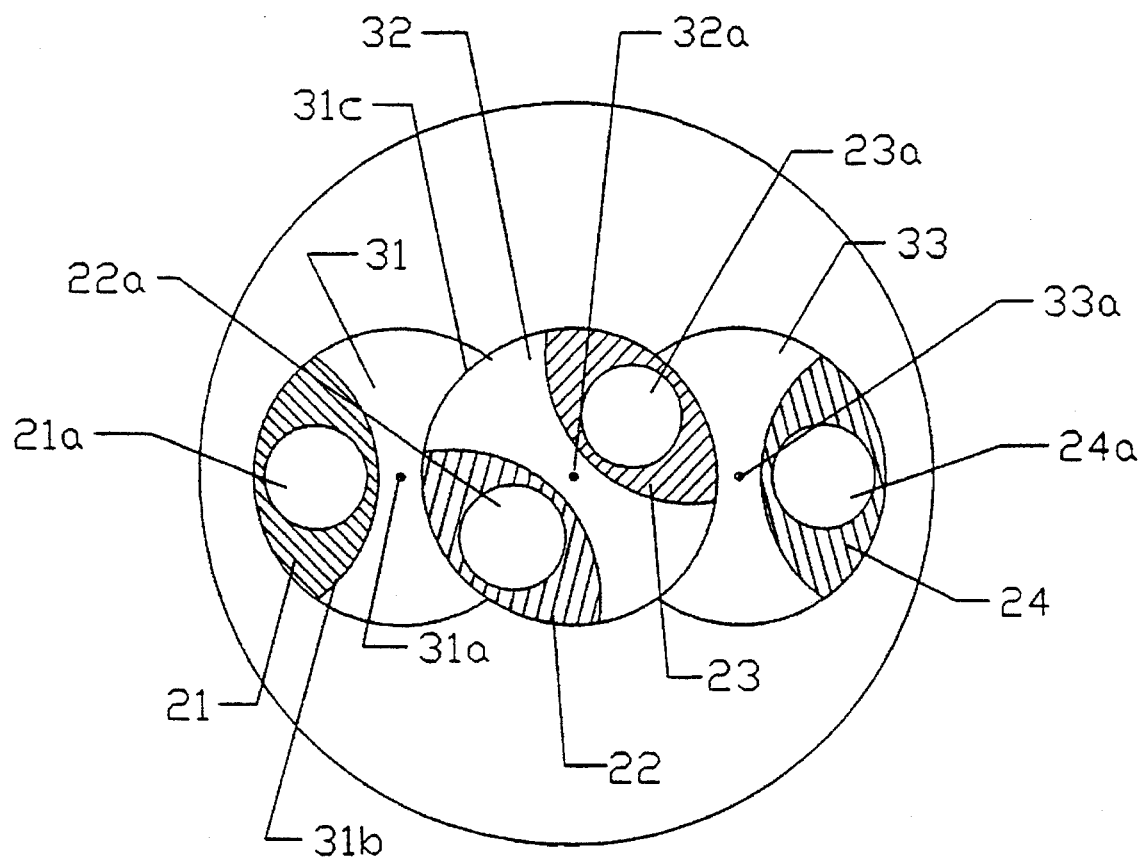
Figure 4:
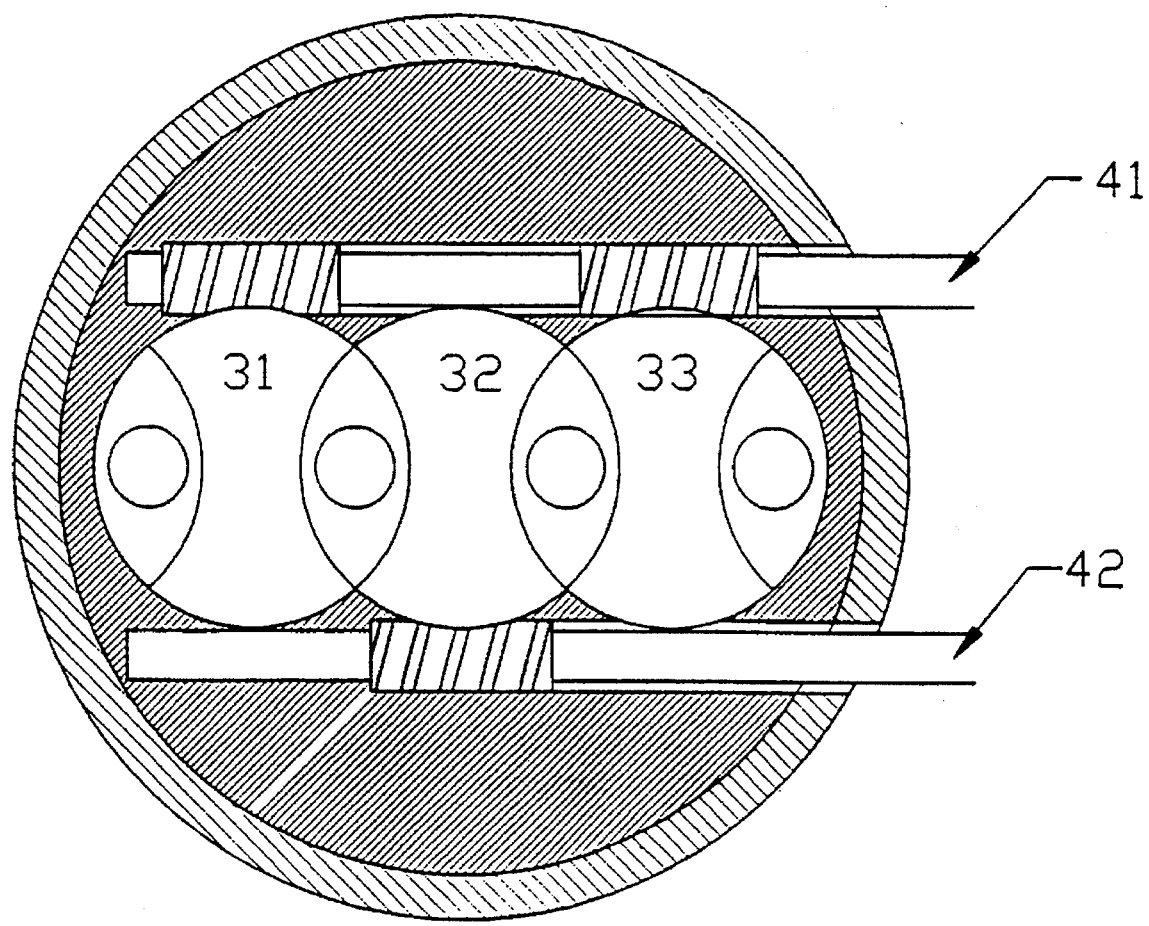
Figure 5:
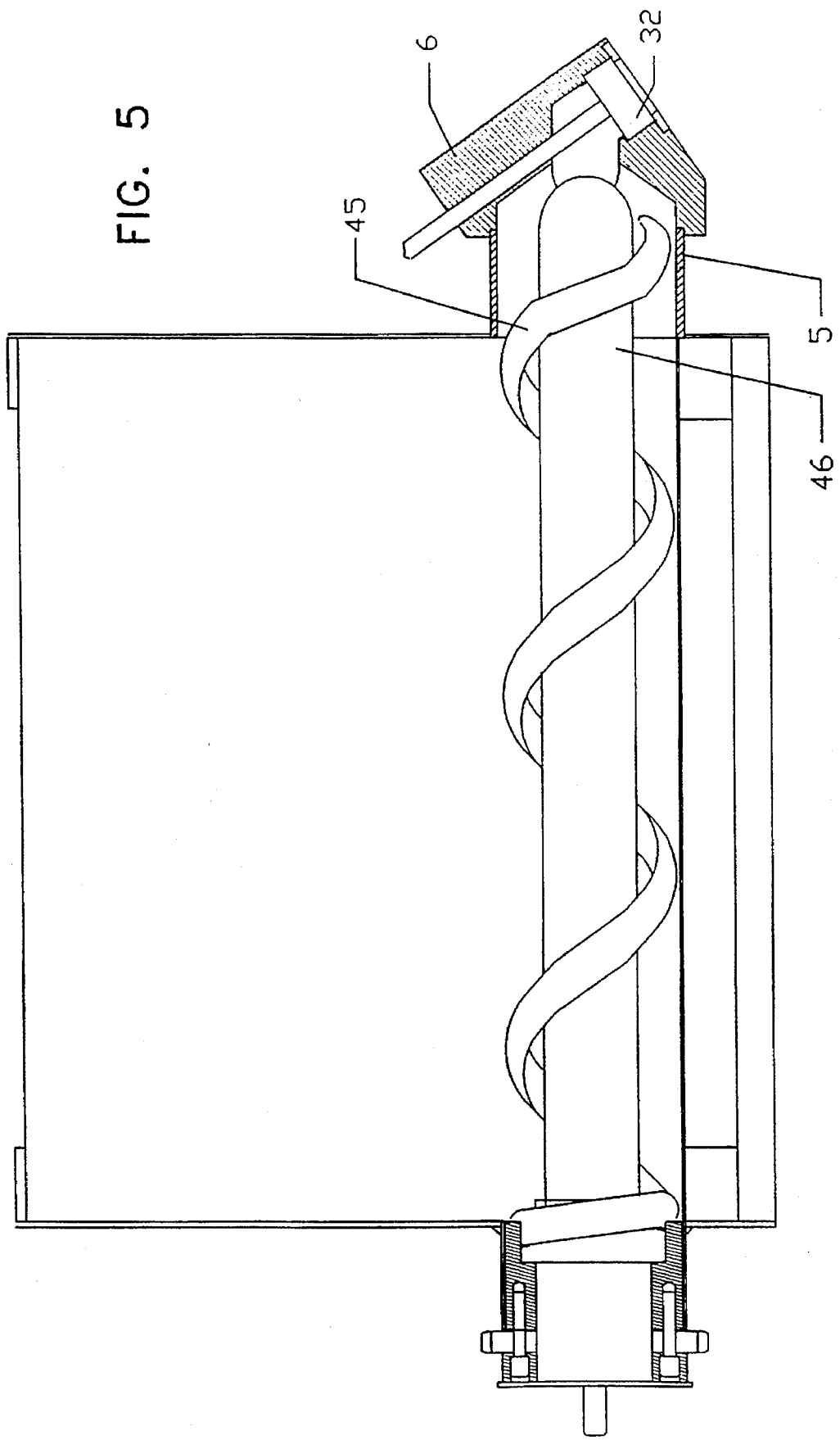

The invention is herein described, by way of example only, with reference to the accompanying drawings, wherein:

FIG. 1 diagrammatically illustrates one form of apparatus constructed in accordance with the present invention;

FIG. 2 diagrammatically illustrates the extruder head in the extrusion apparatus of FIG. 1;

FIG. 3 diagrammatically illustrates various stages in the movement of the die members in the extrusion head of FIG. 2 for producing a braided baked product;

FIG. 4 illustrates another form of drive for driving the die members in the extrusion apparatus of FIG. 1; and FIG. 5 illustrates another form of screw feeder that may be used in the extrusion apparatus of FIG. 1.

The apparatus illustrated in the drawings is an extrusion apparatus particularly useful for producing braided baked products, such as challahs or rolls, in a continuous mechanized fashion. The apparatus includes an extruder, generally designated 2, having a hopper 3 for receiving the dough to be used in making the baked product, and a screw feeder 4 for feeding the dough via a dough chamber 5 through an extruder head 6. As will be described more particularly below with respect to to FIGS. 2 and 3, extruder head 6 includes at least three (four in the example illustrated in FIGS. 2 and 3) die members each formed with an orifice producing an extruded strip of the dough. Such die members are moved relative to each other during the extrusion of the dough to cause the extruded strips to interweave or braid.

The apparatus illustrated in FIG. 1 further includes a closed-loop conveyor belt 7 located to receive the braided strips from the extrusion head 6, and a cutter 8 which cuts the continuous braided strips into separate units defining individual challahs or rolls. The apparatus further includes a drive 9 for driving the screw feeder 4, another drive 10 for driving the drive members in the extrusion head 6, and a further drive 11 for driving the conveyor belt 7. All the foregoing drives, and the cutter 8, may be controlled by a common control unit, schematically indicated by box 12 as will be described more particularly below. Conveyor belt 7 conveys the cut braided pieces of dough through an oven 13 which bakes them to produce the braided baked products, such as challahs or rolls.

FIG. 2 more particularly illustrates the construction of the extruder head 6. It includes a plurality of die members or plates 21–24 all of the same external configuration and each formed with a central orifice 21a–24a of the same diameter. Each orifice 21a–24a thus produces a single strip of the dough extruded by the extruder.

The four die plates 21–24 are moved by three drive members 31–33 in the form of equal diameter discs having parallel axes of rotation 31a–33a. Each drive disc 31–33 is formed on opposite sides of its outer circumference with two cavities, as shown at 31b, 31c of drive disc 31, of a shape complementary to the outer shape of the die plates 21–24. The axes of rotation 31a–33a of the drive discs 31–33 are spaced from each other such that each die plate 21–24 is receivable in either cavity of each drive disc during the rotation of the drive discs.

FIG. 3 illustrates the manner in which the four extruded dough strips, emerging from orifices 21a–24a of the die plates 21–24, are interwoven or braided by the rotation of the three drive discs 31–33. Thus, assuming the die plates 21–24 are initially in alignment as shown in stage (a) of FIG. 3, the two outer drive discs 31–33 are first rotated in the same direction, while the middle drive disc 32 is not rotated, to thereby reverse the position of die plate 21 with respect to die plate 22, and die plate 24 with respect to die plate 23, as shown by stages (a)–(e) in FIG. 3. Then, the middle drive disc 32 is rotated in the opposite direction, while the two outer drive discs 31, 33 are retained stationary, to thereby reverse the positions of die plates 21, 24, as shown in stages (f)–(i) in FIG. 3.

Each drive disc 31–33 may be rotated by a separate motor in the disc drive schematically illustrated at 10 in FIG.

1 under the control of the control circuit 12. FIG. 4 illustrates an alternative arrangement wherein the drive system includes one worm gear 41 for driving the two end drive discs 31, 33, and a second worm gear 42 for driving the middle drive disc 32.

FIG. 5 illustrates a variation wherein the screw feeder is in the form of a helical rod 45, slightly spaced from a central fixed stem 46, and rotated by its motor 9 (FIG. 1) for feeding the dough from the hopper 3, via the dough chamber 5, through the orifices in the extrusion head 6.

Where the illustrated apparatus is used for making challahs or rolls, the cutters 8 would normally be shaped and controlled so as to cut and shape the ends according to the desired shape of the baked product.

While the invention has been described with respect to producing braided baked products, such as challahs or rolls, it will be appreciated that the invention could be used in many other applications. The extrusion head could include another form of head having any desired number of die plates according to the number of strips to be fed and braided. The drive discs could be arrayed with their axes of rotation not only according to a linear array as illustrated in the drawings, but also according to a rectangular array or a circular array, in a single line or in a plurality of lines. In addition, the orifices in the disc plates could be of polygonal or other non-circular cross-sections.

Many other variations, modifications and applications of the invention will be apparent.

I claim:

1. A method of producing a braided baked product from dough, comprising:

feeding the dough through a die head having at least three relatively-moving die members each formed with an orifice feeding a strip of the dough;

moving said die members relative to each other during the feeding of the dough to cause said strips to interweave;

and baking said interwoven strips to produce said braided baked product.

2. The method according to claim 1, wherein said die members are plates of the same external shape, and are movable relative to each other by at least two rotatable drive members each formed on its outer circumference with at least two cavities of a shape complementary to that of the die plates for receiving and moving the die plates during the rotation of the drive member.

3. The method according to claim 2, wherein said drive members are in the form of equal-diameter discs having parallel axes of rotation spaced from each other a distance such that each die plate is receivable in either cavity of each drive disc so as to be moved by the rotation thereof.

4. The method according to claim 3, wherein there are at least four of said die plates moved by at least three of said drive discs.

5. The method according to claim 1, wherein said interwoven strips are fed onto a conveyor, are cut into individual units, and are then conveyed through a baking oven.

6. Apparatus for producing a braided baked product from dough, comprising:

a feeder having a die head including at least three relatively-movable die members each formed with an orifice for feeding a strip of the dough;

a drive for moving said die members relative to each other during the feeding of the dough to cause the strips to interweave;

and an oven for baking said interwoven strips thereby to produce said braided baked product.

7. The apparatus according to claim 6, wherein said die members are plates of the same external shape, and are movable relative to each other by at least two rotatable drive members each formed on its outer circumference with at least two cavities of a shape complementary to that of the die plates for receiving and moving the die plates during the rotation of the drive member.

8. The apparatus according to claim 7, wherein said drive members are in the form of equal-diameter discs having parallel axes of rotation spaced from each other a distance such that each die plate is receivable in either cavity of each drive disc so as to be moved by the rotation thereof.

9. The apparatus according to claim 8, wherein there are at least four of said die plates moved by at least three of said drive discs.

10. The apparatus according to claim 6, further including a moving belt for receiving said interwoven strips, and a cutter for cutting the interwoven strips into individual units before they are conveyed through said oven.

11. The method according to claim 1, wherein said feeding of the dough through a die head is effected by extruding the dough through an extruder die head.

12. The apparatus according to claim 6, wherein said feeder having a die head is en extruder having an extruder die head.

* * * * *

UNITED STATES PATENT AND TRADEMARK OFFICE
CERTIFICATE OF CORRECTION

PATENT NO. :  5,637,341
DATED      :  June 10, 1997
INVENTOR(S):  Ram RIVLIN

It is certified that error appears in the above-indentified patent and that said Letters Patent is hereby corrected as shown below:

On title page, insert -- [30] Foreign Application Priority Nov. 3, 1993 [IS] Israel 107,481 --.

Signed and Sealed this

Second Day of June, 1998

Attest:

BRUCE LEHMAN

*Attesting Officer*    Commissioner of Patents and Trademarks